United States Patent [19]
Kepirq

[11] 3,783,835
[45] Jan. 8, 1974

[54] ANIMAL LEASH
[76] Inventor: Joseph Kepirq, R.D. No. 2, Parkesburg, Pa. 19365
[22] Filed: July 14, 1972
[21] Appl. No.: 271,637

[52] U.S. Cl. .............................................. 119/109
[51] Int. Cl. ............................................ A01k 27/00
[58] Field of Search .......................... 119/109, 106; 57/159; 24/73.2

[56] References Cited
UNITED STATES PATENTS
2,827,017  3/1958  Ryan .................................... 119/109

*Primary Examiner*—Hugh R. Chamblee
*Attorney*—Clifford B. Price, Jr.

[57] ABSTRACT

An animal leash is normally provided with two looped ends. One looped end is used to receive the hand of the person walking the animal. The other looped end is used to receive some type of fastening means which connects the leash to the animal. The leash herein has the two looped ends formed without the utilization of any fastening structures. The ends of the leash are braided into a loop, causing the leash itself to be the means for sustaining the loop structure.

2 Claims, 3 Drawing Figures

PATENTED JAN 8 1974
3,783,835
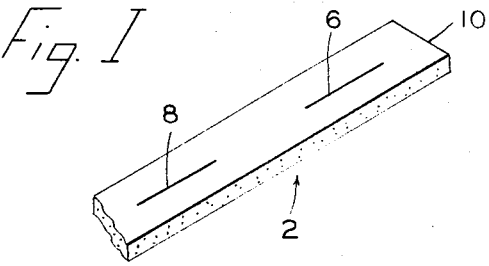
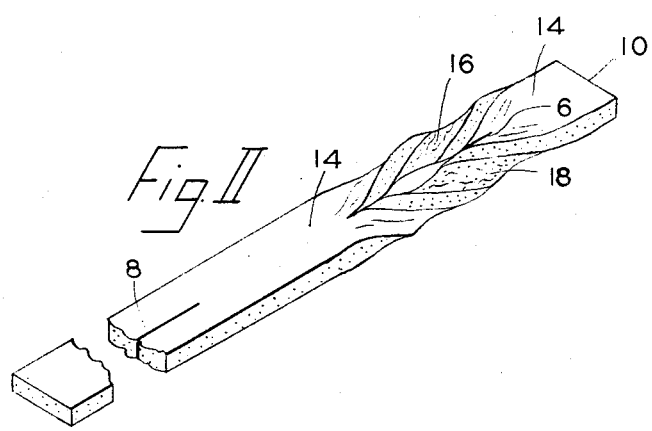
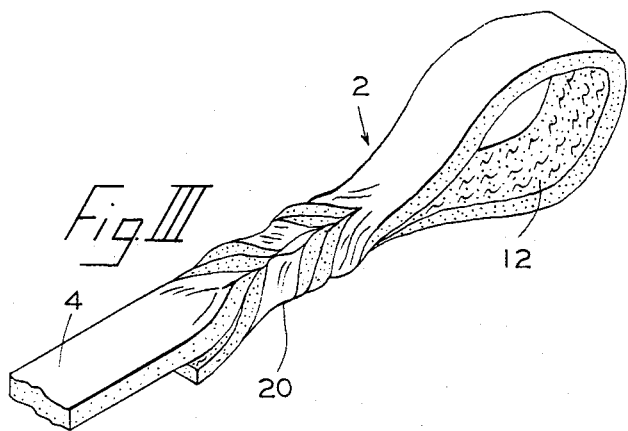

3,783,835

ANIMAL LEASH

BACKGROUND OF THE INVENTION

1. Field of the Invention

The invention herein is a looped structure and, more particularly, an animal leash which has a looped end.

2. Description of the Prior Art

There are a number of animal leashes available on the open market. Most of the leashes are provided with some type of mechanical fastening structure to hold one end of the leash relative to a midportion of the leash to form a loop into which is placed the hand of the user of the leash. The mechanical fastening means are normally staples or clip fasteners which must be fastened to the material which forms the leash. The leash is normally made as a flat strip of leather or a chain structure.

U. S. Pat. No. 3,603,295 shows a leash structure which as a hand loop formed therein without the use of a mechanical fastening means. The free end of the loop structure is grasped by the hand of the user of the leash to maintain the loop configuration.

It is the purpose of the invention herein to take a flat strip leather leash and form a loop structure in at least one end thereof without the use of any type of mechanical external fastening means to sustain the loop configuration. At the same time the purpose is to form a loop structure which will be sefl-sustaining itself without the need of the user of the leash holding the leather strap in its looped configuration.

SUMMARY OF THE INVENTION

The leather strap herein is provided with two slits at each end of the strap. By folding the strap through each of the two slits twice, it is possible to braid the strap into a very tight braided structure which holds one end of the strap relative to the body of the strap to form a loop structure. The slits are placed in the body of the strap at definite distances from the end of the strap in order to form loops of different sizes. The loop at one end of the strap can be used as a hand hold for one who is using the strap as an animal leash. A loop formed at the other end of the strap would hold a quick disconnector or some other type of structure which can be fastened to an animal collar. A loop so formed above is a non-slip loop which is fixed in size and cannot be pulled apart and can only be disconnected by unbraiding the leather strap in the reverse order in which it was braided.

BRIEF DESCRIPTION OF THE DRAWING

FIG. I is a perspective view of the end of a leather strap with slits therein;

FIG. II is a perspective view of the end of a leather strap partially braided; and FIG. III is a perspective view of a leather strap which has been braided to form a loop on the end thereof.

DESCRIPTION OF THE PREFERRED EMBODIMENT

The invention herein is meant primarily to be utilized to form a loop in the end of the leather strap to form an animal leash. It could be used to simply form a loop in any type of strap-type flexible material for the purpose of forming a loop in the end thereof.

In FIG. I there is shown the end 2 of a strap structure. It should be recognized that any strap structure will have two ends 2 and a body portion 4 midway between the two ends. In the ends 2 there would be provided two elongated slits which extend along the longitudinal axis of the strap. One slit 6 will be closer to the end of the strap than will the other slit 8. On a ⅝ inch wide, ⅛ inch thick leather strap, the slits are about 1 3/4 inches long and are spaced apart 15 inches to form a loop of about 5 inches in diameter. The space in between the slits 6 and 8 determines the size of the loop formed. The slit 6 is normally placed one-half inches from the extreme tip 10 of the strap.

FIGS. II and III show the strap partially braided and fully braided into a connecting structure which holds the end 2 of the strap relative to the body 4 of the strap for the purpose of forming the loop 12. FIG. II shows the strap partially conditioned prior to the actual braiding together of the end of the strap and the middle portion of the strap. After the slits 6 and 8 have been formed in the strap at the desired locations to form the desired loop size, the tip 10 of the strap is folded back upon itself so the tip 10 can pass through the slot 6. The tip 10 is then pulled outwardly away from the strap and this provides a structure wherein the strap takes on the appearance of FIG. II. In effect what has happened is the strap has been twisted about itself on either side of the slit 6 so that you see at one end of the slit, the top 14. At the middle of the slit 6 you see the bottom 16 of the strap and then again the top 14 of the strap at the other end of the slit.

Next you will fold the same end, the tip 10, through the second slit 8 by again bending the top 14 of the strap over top of itself and passing the tip 10 through the slit 8. Again pulling on the tip 10 relative to the body of the strap will now form the region on either side of slit 8 in the same manner as shown in FIG. II for the region on either side of slit 6. The third step is to again take the tip 10 and pass it a second time through the slit 8 after the slit 8 has been conditioned as above described. However, this time rather than passing the surface 14 back over itself and the tip 10 through the slit 8, the strap is folded in the opposite direction. That is, the underside surface 18 of the strap is folded back against itself so that the tip 10 is now passed through the slit 8 in the opposite direction from that which the tip 10 passed the first time that the tip 10 passed through the slit 8. The tip 10 is now pulled away from the main body of the strap slightly and then the opposite end of the strap is passed through the slit 6. This now forms the loop 12 and by holding onto the loop 12 and pulling on the main body 4 of the strap, the braided section 20 is formed. This section then will hold the loop 12 in a fixed size relationship and the loop 12 cannot slip apart.

This technique is particularly useful in braiding together straps which will be used an animal leashes. The loop 12 could be used as a hand loop for the hand of the user of the leash or else some type of connector structure could be placed in the loop 12 for the purpose of connecting the leash to the collar of the animal. The connecting piece is normally placed midway between the two slits 6 and 8 after the first two folding operations are done. As the second two folding operations are done, the loop is formed with the connecting piece within the loop.

What is claimed is:

1. The method of forming a loop in a flat strap comprising the steps of: placing two longitudinal slits in the end of the strap, passing the tip of the strap through first the first slit and then through the second slit to form the end of the strap with the strap folded about itself on either side of both slits, then folding the end of the strap through the second slit again in a direction opposite from that which it passed through the second slit the first time it passed through the slit, and then finally passing the opposite end of the strap through the first slit to form a braided connector for holding the first mentioned end of the strap in a fixed size non-releasable looped configuration.

2. A product made according to the process of claim 1.

* * * * *